US010516294B2

(12) United States Patent
Guckin et al.

(10) Patent No.: US 10,516,294 B2
(45) Date of Patent: Dec. 24, 2019

(54) UNINTERRUPTIBLE CONSTANT CURRENT REGULATOR (71) Applicants: Mark E. Guckin, Middleton, CT (US); John B. Schneider, West Springfield, MA (US)

(72) Inventors: Mark E. Guckin, Middleton, CT (US); John B. Schneider, West Springfield, MA (US)

(73) Assignee: EATON INTELLIGENT POWER LIMITED, Dublin (IE)

( * ) Notice: Subject to any disclaimer, the term of this patent is extended or adjusted under 35 U.S.C. 154(b) by 756 days.

(21) Appl. No.: 14/617,285

(22) Filed: Feb. 9, 2015

(65) Prior Publication Data

US 2016/0233719 A1 Aug. 11, 2016

(51) Int. Cl.
*H02J 9/00* (2006.01)
*H02J 9/06* (2006.01)
*H02J 7/00* (2006.01)
*B64F 1/20* (2006.01)
*H02J 1/10* (2006.01)

(52) U.S. Cl.
CPC ............... *H02J 9/061* (2013.01); *B64F 1/20* (2013.01); *H02J 1/108* (2013.01); *H02J 7/0068* (2013.01); *H02J 9/065* (2013.01)

(58) Field of Classification Search
CPC .......... H02J 9/061; H02J 7/0068; H02J 3/005; H02J 9/06; H02J 1/108; H02J 9/065; B64F 1/20
USPC ..................... 307/64; 315/291, 297, 302, 307
See application file for complete search history.

(56) References Cited

U.S. PATENT DOCUMENTS

| 3,829,735 | A | 8/1974 | Berlock et al. |
| 4,313,063 | A | 1/1982 | McHerron |
| 4,675,574 | A | 6/1987 | Delflache |
| 5,371,456 | A | 12/1994 | Brainard et al. |
| 5,751,566 | A | 5/1998 | Vongehr |

(Continued)

FOREIGN PATENT DOCUMENTS

| EP | 0477568 A2 | 4/1992 |
| EP | 1122873 | 8/2001 |

(Continued)

OTHER PUBLICATIONS

A. Golovchenko, International Search Report and Written Opinion issued in International Patent Application No. PCT/US2016/016824, completion date Apr. 28, 2016, dated Jul. 14, 2016, 6 pages, Federal Institute of Industrial Property, Moscow, Russia.

(Continued)

*Primary Examiner* — Richard Tan
(74) *Attorney, Agent, or Firm* — King & Spalding LLP (57) ABSTRACT The present disclosure provides an uninterruptible constant current regulator circuit capable of receiving power from a primary power source and a secondary power source, and switches between the two according to the condition of the provided power. Specifically, the uninterruptible constant current regulator provides a first voltage from the primary source to a load until the first voltage falls below a threshold value, at which point the uninterruptible constant current regulator automatically switches to provide a second voltage from the secondary source to the load.

15 Claims, 4 Drawing Sheets (56) References Cited

U.S. PATENT DOCUMENTS

| | | | |
|---|---|---|---|
| 5,818,172 A * | 10/1998 | Lee | H05B 41/2853 |
| | | | 315/86 |
| 5,818,203 A * | 10/1998 | Narita | H01M 10/44 |
| | | | 320/128 |
| 5,825,164 A | 10/1998 | Williams | |
| 5,872,457 A | 2/1999 | Williams | |
| 5,926,115 A | 7/1999 | Schleder et al. | |
| 6,152,577 A | 11/2000 | Rizkin et al. | |
| 6,300,878 B1 | 10/2001 | Galloway et al. | |
| 6,812,652 B2 | 11/2004 | Munson et al. | |
| 7,466,082 B1 * | 12/2008 | Snyder | H05B 33/0818 |
| | | | 315/200 A |
| 8,115,418 B2 * | 2/2012 | Haubmann | H05B 33/0851 |
| | | | 315/185 R |
| 8,138,683 B2 | 3/2012 | Catoul et al. | |
| 8,193,794 B2 | 6/2012 | Peng et al. | |
| 2002/0093317 A1 * | 7/2002 | Matsuda | H02M 1/10 |
| | | | 323/273 |
| 2005/0162098 A1 * | 7/2005 | Ball | H05B 33/0815 |
| | | | 315/291 |
| 2007/0170873 A1 * | 7/2007 | Mishima | H05B 41/2886 |
| | | | 315/291 |
| 2008/0116820 A1 * | 5/2008 | Ozasa | H05B 41/2928 |
| | | | 315/246 |
| 2010/0026207 A1 | 2/2010 | Facchini et al. | |
| 2010/0045245 A1 | 2/2010 | Hawley | |
| 2010/0283400 A1 | 11/2010 | Catoul et al. | |
| 2012/0126715 A1 * | 5/2012 | Sato | H05B 41/2882 |
| | | | 315/224 |
| 2012/0146536 A1 | 6/2012 | Mullen et al. | |
| 2012/0176066 A1 * | 7/2012 | Lin | H05B 33/0824 |
| | | | 315/307 |
| 2012/0299381 A1 | 11/2012 | Larson | |
| 2013/0082624 A1 | 4/2013 | Brassfield et al. | |
| 2014/0285109 A1 * | 9/2014 | Liao | H05B 33/0815 |
| | | | 315/291 |
| 2015/0015076 A1 | 1/2015 | Park | |

FOREIGN PATENT DOCUMENTS

| | | |
|---|---|---|
| EP | 2398298 | 12/2011 |
| JP | 5477967 | 4/2014 |
| RU | 99915 | 11/2010 |
| WO | 9908489 | 2/1999 |
| WO | 2006128008 | 11/2006 |

OTHER PUBLICATIONS

Machine Translation of JP 5477967, via LexsisNexis Total Patent, 8 pages.
Machine Translation of RU 99915, via LexsisNexis Total Patent, 4 pages.
Extended European Search Report, issued in European Patent Application No. 16749638.9, dated Aug. 21, 2018, 7 pages, European Patent Office, Munich, Germany.
Machine Translation of EP 0477568A2, via LexsisNexis Total Patent, 6 pages.

* cited by examiner

UNINTERRUPTIBLE CONSTANT CURRENT REGULATOR

TECHNICAL FIELD

Embodiments of this disclosure relate generally to power supply switching and power regulation, and more particularly to an uninterruptible constant current regulator.

BACKGROUND

Constant current regulators (CCRs) are used to convert an input AC voltage into an output AC current in order to provide power to constant current loads, such as airfield lighting series circuits. Typically, the primary source of input power for constant current regulators is provided by the local utility. A secondary source of input power may be a generator or a separate feeder from the local utility. During certain situations, it may be advantageous to remotely switch from the primary power source to the secondary source. For example, in the airfield environment, it may be advantageous to switch from receiving power from the local utility to receiving power from a generator during low visibility or other poor weather conditions, as the generator may be more reliable than the local utility under such circumstances.

One method of switching from the input contacts of one power source to the input contacts of another power source is a "break-before-make" operation, in which the first power source is disconnected from the constant current regulator before the second power source is connected to the constant current regulator. During the transition period, the input power drops to zero. The transition period may vary, often lasting between 25 milliseconds to hundreds of milliseconds. In certain cases, the transition period is long enough for the constant current regulator to dissipate its internal energy and the constant current regulator may turn off and reset. Typically, the time for a constant current regulator to return to full current after a reset is five seconds. In certain applications, such a delay is longer than is desirable. However, when the transition time is less than the time required for the constant current regulator to dissipate its internally stored energy, the constant current regulator may generate large output current spikes that may be detrimental to the load.

SUMMARY

In an example embodiment of the present disclosure, an uninterruptible constant current regulator includes a primary power input, a secondary power input, a constant current regulating circuit, and a switching device. The primary power input is configured to receive a first voltage from a primary power source. The secondary power input is configured to receive a second voltage from a secondary power source. The constant current regulating circuit is configured to regulate and provide power from either the primary power source or the secondary power source to a load. The switching device is coupled to the primary power input, the secondary power input, and the constant current regulating circuit, wherein the switching device provides the first voltage from the primary power input to the constant current regulating circuit during a first operating mode, and provides the second voltage from the secondary power input to the constant current regulating circuit when the first voltage falls below a threshold value.

In another example embodiment of the present disclosure, an uninterruptible constant current regulator includes a primary power input, a secondary power input, and a constant current regulating circuit. The primary power input is configured to receive a first voltage from a primary power source. The secondary power input is configured to receive a second voltage from a secondary power source. The constant current regulating circuit is configured to deliver a regulated power to a load, wherein the constant current regulating circuit receives either the first voltage from the primary power source or the second voltage from the secondary source. The constant current regulating circuit automatically switches from receiving the first voltage to receiving the second voltage when the first voltage falls below a threshold value.

In another example embodiment of the present disclosure, a method of providing uninterruptible power includes receiving a first input voltage from a primary power source, and determining if the first input voltage is higher than a threshold value. When the first input voltage is higher than the threshold value, the first input voltage is provided to a constant current regulation circuit as a supplied voltage. When the first input voltage is not higher than the threshold value, a second input voltage is provided from a secondary power source to the constant current regulation circuit as the supplied voltage. Specifically, the second input voltage is automatically provided to the constant current regulation circuit when the first input voltage is detected to have fallen below the threshold value. The method further includes conditioning the supplied voltage and providing a conditioned supplied voltage to a load.

BRIEF DESCRIPTION OF THE DRAWINGS

Reference will now be made to the accompanying drawings, which are not necessarily drawn to scale, and wherein.

DETAILED DESCRIPTION OF EXAMPLE EMBODIMENTS

The example embodiments discussed herein are directed to an uninterruptible constant current regulator (UCCR) capable of switching between two or more power sources without disrupting power supplied to the load. Although the description of example embodiments is provided herein in conjunction with airfield lighting systems and environments, alternate example embodiments are applicable to other industries, environments, and applications. Furthermore, while example embodiments described herein utilize certain example electrical components, other functionally similar components or combinations of components can be used in other embodiments without leaving the scope of the present disclosure. The example embodiments are better understood by reading the following description of non-limiting, example embodiments with reference to the attached drawings, wherein like parts of each of the figures are identified by like reference characters, and which are briefly described as follows. In the following detailed description of the example embodiments, numerous specific details are set forth in order to provide a more thorough understanding of the disclosure herein. However, it will be apparent to one of ordinary skill in the art that the example embodiments disclosed herein may be practiced without these specific details. In other instances, well-known features have not been described in detail to avoid unnecessarily complicating the description.

The present disclosure provides an uninterruptible constant current regulator capable of switching between two or more power sources without disrupting power supplied to a load. Specifically, in certain example embodiments, the uninterruptible constant current regulator is coupled to an external AC source, such as a local utility, and also includes a battery configured to automatically switch into the input when the power is lost from the AC source.

Figure 1:
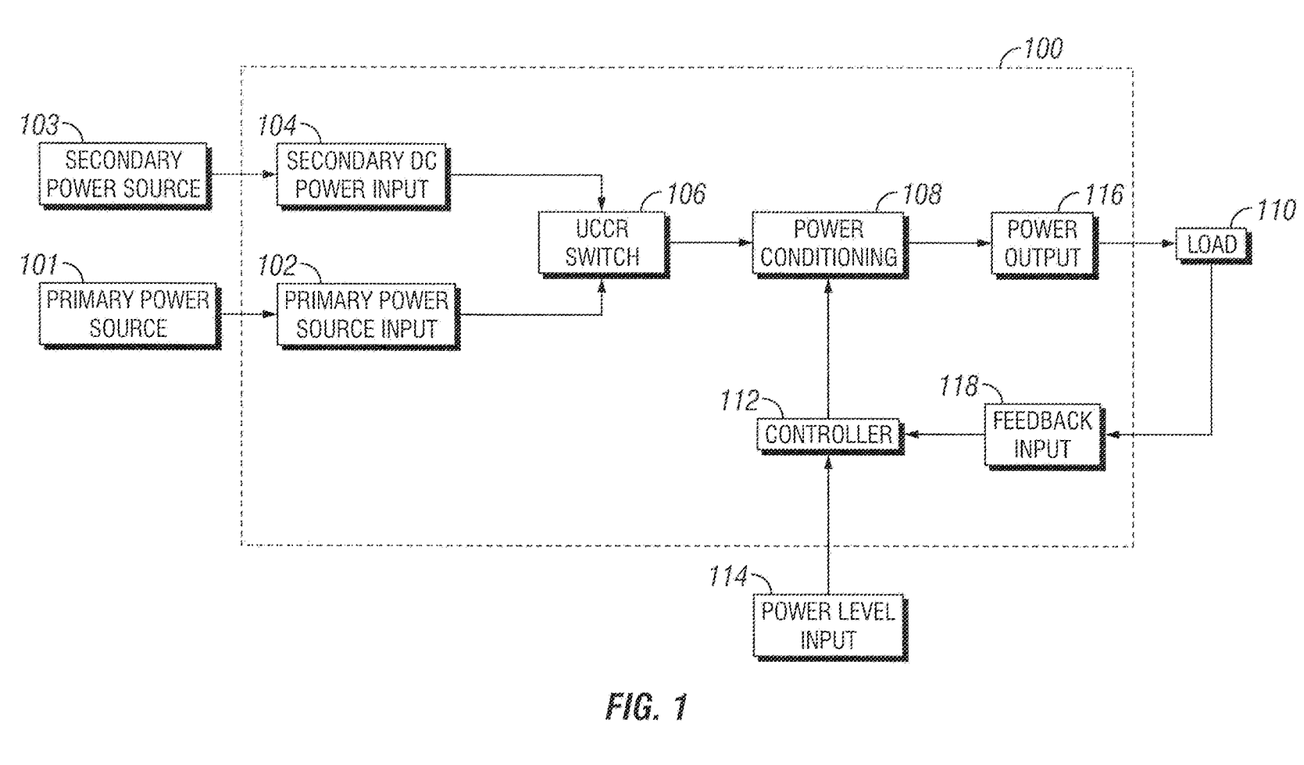
FIG. 1 illustrates a high-level block diagram of an uninterruptible constant current regulator, in accordance with certain embodiments of the present disclosure.

Turning to the figures, FIG. 1 illustrates a high-level block diagram of an uninterruptible constant current regulator 100 in accordance with example embodiments of the present disclosure. In certain example embodiments, the uninterruptible constant current regulator 100 includes a primary power input 102, a secondary power input 104, and a UCCR switch 106. The UCCR switch 106 can be an automatic or a manually operated switch. In certain example embodiments, the primary power input 102 is coupled to a primary power source 101 such as a local utility or a power supply. In certain example embodiments, the primary power source 101 receives AC power from a local utility and converts the AC power into a DC voltage via an AC/DC converter, and then supplies the DC power to the primary power input 102.

In certain example embodiments, the secondary power input 104 receives power from a secondary power source 103, such as DC power source like a battery. In certain other example embodiments, the secondary power input 103 includes a flywheel, one or more capacitors, a generator, or another power storage element. In certain example embodiments, the secondary power source 103 can receive power from an AC source such as a utility. In certain such examples, a power storage element can be charged by the AC source. In certain example embodiments, the secondary power source and the primary power source 101 can receive power from the same source. In certain example embodiments, the switch 106 is coupled to the primary power input 102 and the secondary power input 104 and configured to switch between the two under certain predetermined conditions. For example, in certain embodiments, the switch 106 is configured to switch from accepting powering from the primary power input 102 to accepting power from the secondary power input 104. In certain example embodiments, the switch 106 is configured to switch from the primary power input 102 to the second power input 104 when the input voltage of the primary power input 102 falls to zero. Thus, when the input voltage of the primary power input 102 falls to zero, the secondary power input 104 is switched in to provide continuous power.

The uninterruptible constant current regulator 100 further includes a power conditioning circuit 108 coupled to the UCCR switch 106, and a power output 116 coupled to and configured to receive power from the power conditioning circuit 108. The power conditioning circuit 108 receives power from the first power input 102 or the secondary power input 104 through the UCCR switch 106 depending on which of the power sources 102, 104 is active. In certain example embodiments, the UCCR switch 106 is a diode network. The diode network includes a first diode, in which the anode of the first diode is coupled to the primary power input and the cathode of the first diode is coupled to the constant current regulating circuit. The diode network further includes a second diode, in which the anode of the second diode is coupled to the secondary power input and the cathode of the second diode is coupled to the constant current regulating circuit. The diode network forms an UCCR switching mechanism 106 configured to switch between receiving power from the primary power source and the secondary power source. For example, when voltage from the primary power source falls below a threshold value, the power conditioning circuit automatically switches from receiving power from the primary power source to receiving power form the secondary power input 104 via the switch 106.

In certain example embodiments, the power output 116 is coupleable to and provides power to a load 110. In certain example embodiments, the power conditioning circuit 108 includes one or more components configured to condition the incoming power from the power sources 102, 104 into a form usable by the load 110. For example, in some embodiments, the power conditioning circuit 108 further includes a DC/DC boost controlled to raise or lower the provided voltage level according to the desired power level to be provided to the load 110. In certain example embodiments, the load 110 is an airfield lighting system. In certain example embodiments in which the load 110 is an AC driven load, the power conditioning circuit 108 further includes a DC/AC inverter configured to convert the provided DC voltage into an AC voltage usable by the load 110. In embodiments in which the load 110 is a DC driven load, the DC/AC inverter may be omitted. In certain example embodiments, power conditioning circuit 108, the power output 116, the feedback input 118, and the controller 112 are collectively called a constant current regulating circuit, which in other example embodiments, can include a subset of the above-mentioned components and/or additional components.

The uninterruptible constant current regulator 100 further includes a feedback input 118 coupleable to the load 110 and configured to receive a feedback signal from the load 110 indicative of the actual current level of the load 110. The feedback input 118 is coupled to a controller 112 and delivers the feedback signal to the controller 112. The controller 112 is further coupled to a current level input 114 and receives an input signal indicative of a desired current level of the load 110. For example, in an embodiment in which the load 110 is a lighting system, the desired current level of the load 110 is specified as a result of a desired intensity level of the light, and the power level input 114 is a brightness selector. In certain example embodiments, controller 112 compares the desired current level from the current level input 114 with the actual current level of the load 110 received through the feedback input 118 and adjusts the power conditioning circuit 108 accordingly, thereby adjusting the current delivered to the load 110. Specifically, in certain example embodiments, the DC/DC boost of the conditioning circuit 108 is adjusted.

Figure 2:
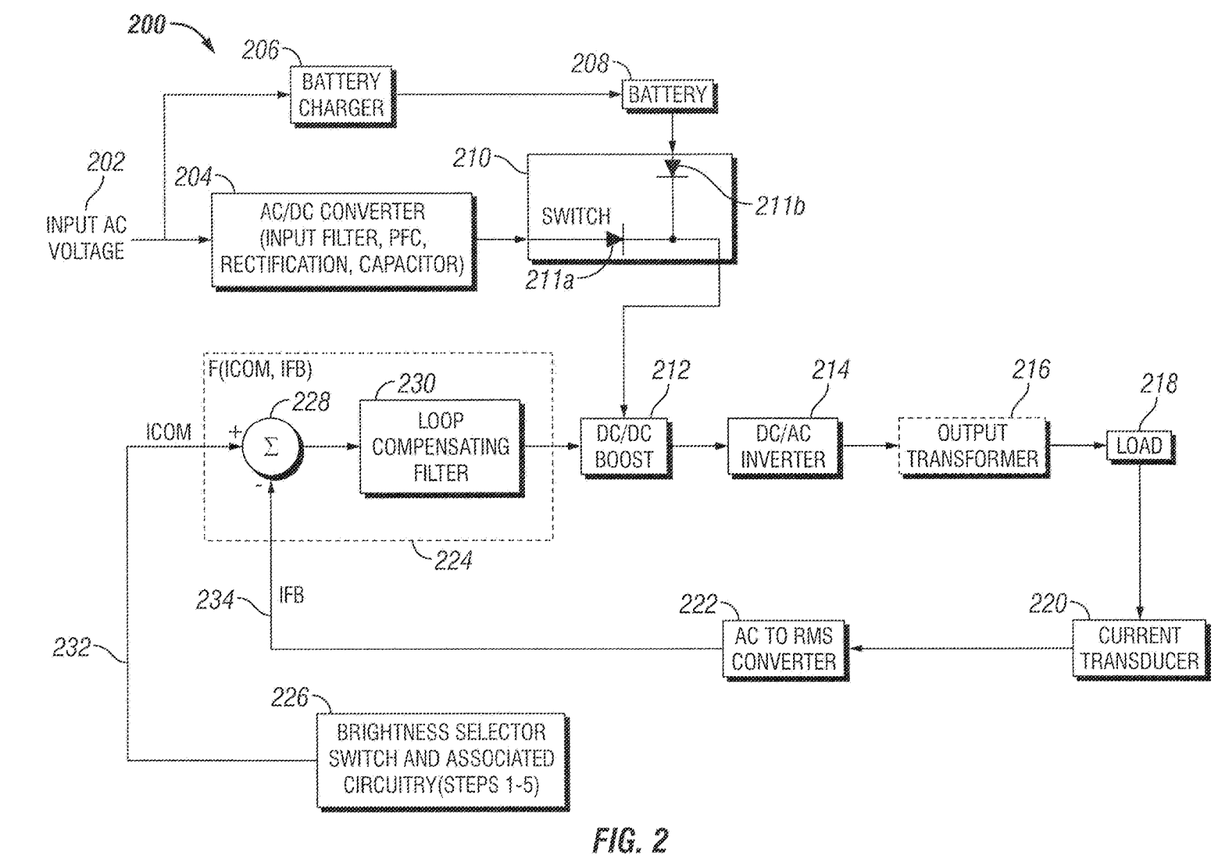
FIG. 2 illustrates a detailed block diagram of an uninterruptible constant current regulator, in accordance with certain embodiments of the present disclosure.

FIG. 2 illustrates a block diagram of another embodiment of an uninterruptible constant current regulator 200, in accordance with embodiments of the present disclosure. Referring to FIG. 2, the uninterruptible constant current regulator 200 includes an AC/DC converter 204 configured to receive input power from a input AC voltage 202, such as a utility. The AC/DC converter 204 converts the input AC voltage 202 into a DC voltage. In certain example embodiments, the uninterruptible constant current regulator 200 also includes a battery 208 and a battery charger 206. The battery charger 206 is coupled to and receives power from the input AC voltage 202 to charge the battery 208. The battery 208 and the AC/DC converter 204 are coupled to an switch 210. In certain example embodiments, the switch 210 includes a diode network, which includes a diode coupled to the battery 208 and a diode coupled to the AC/DC converter 204. Specifically, in certain example embodiments, the AC/DC converter 204 is coupled to the anode of a first diode 211a and the cathode of the first diode 211a is coupled to a DC/DC boost 212. Likewise, in certain example embodiments, the battery 208 is coupled to the anode of a second diode 211b and the cathode of the second diode 211b is coupled to the DC/DC boost 212. The diodes form an automatic switching mechanism in which when the input AC voltage 202 falls to zero, the battery is "switched on" and begins providing power through the switch 210. In certain example embodiments, during normal operating conditions, power is provided from the AC/DC converter through the switch 210. Thus, power is provided through the switch 210 either from the input AC voltage 202 or the battery 208, and the two can be switched seamlessly without substantially interrupting the delivery of power through the switch 210. In certain example embodiments, the switch 210 is replaced with a switch which is controlled by a remote source. In certain example embodiments, the switching is performed manually through a manually controlled switch.

In certain example embodiments, the switch 210 is coupled to the DC/DC boost 212, thereby providing power from either the battery 208 or the input AC voltage 202 to the DC/DC boost 212. In certain example embodiments, the uninterruptible constant current regulator 200 includes a controller 224. The controller 224 is configured to control the DC/DC boost 212 to provide the desired voltage boost. The adjusted voltage is then sent to a DC/AC inverter 214 to convert the DC power into AC power. In certain example embodiments, the output of the DC/AC inverter 214 is sent through an output transformer 216 in order to boost the voltage even higher. Then the power is delivered to a load 218. The load 218 can be any type of load, such as a lighting system.

The uninterruptible constant current regulator 200 further includes a feedback path 234 from the load 218 to the controller 224 indicative of the actual current level at which the load 218 is operating. Specifically, in certain example embodiments, the feedback path 234 includes a current transducer 220 coupled to the load 218. The current transducer generates a current indicative of the current level at the load 218. In certain example embodiments, the output current from the current transducer 220 is sent to an AC/RMS converter 222, which converts the current signal into an RMS signal indicative of the power level at the load 218. The output of the AC/RMS converter 222 is sent to the controller 224.

In certain example embodiments, the controller 224 further includes a summing node 228 and a loop compensating filter 230. In certain example embodiments, the summing node receives the feedback 234 from the load 218 in the form of an RMS signal. The summing node also receives a command current 232 from a selector input 226. In certain example embodiments, the selector input 226 is a user-end accessible or computer controllable input through which a user or computer can select the desired power level at which to operate the load 218. In certain example embodiments, the selector input 226 is a type of switch. The selector input 226 sends a command current 232 indicative of the desired current level at which to operate the load 218 to the controller 224. In certain example embodiments, the summing node 228 receives the command current 232 and the load current feedback 234, and takes the difference between the command current 232 and the load feedback 234. Thus, the controller 224 determines a difference between the desired current level and the actual current level of the load 218. In certain example embodiments, the difference is sent to the loop compensating filter 230. In certain example embodiments, the loop compensating filter 230 limits the bandwidth and gain of the feedback loop and may perform other appropriate adjustments/processing of the signal. The output of the controller 224 is sent to the DC/DC boost 212 and controls how much the input voltage power is to be boosted in order to match the actual current level of the load 218 to the desired power level of the load 218.

Figure 3:
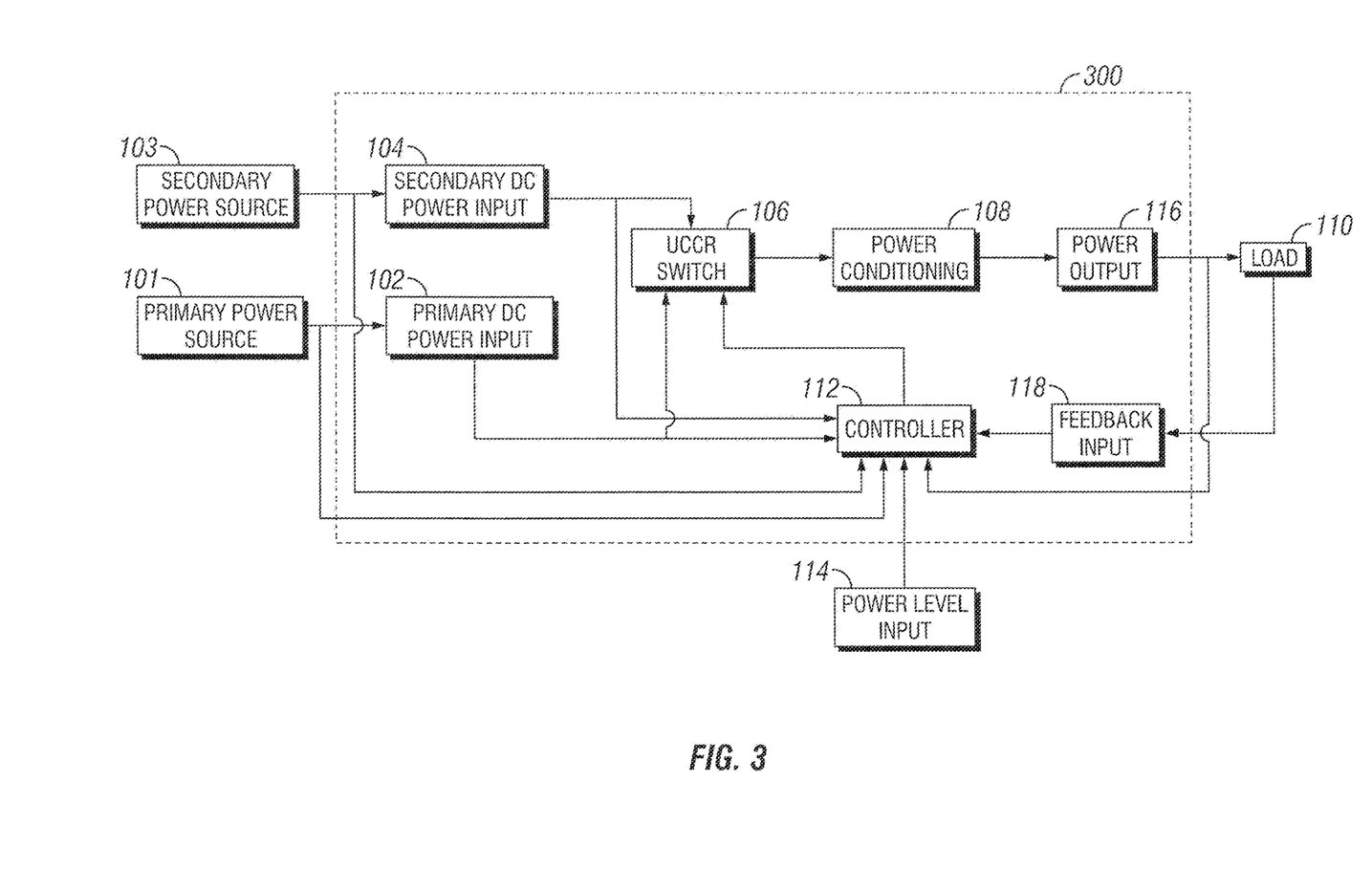
FIG. 3 illustrates a high-level block diagram of another embodiment of an uninterruptible constant current regulator, in accordance with example embodiments of the present disclosure.

FIG. 3 illustrates a high-level block diagram of another embodiment of an uninterruptible constant current regulator 300, in accordance with example embodiments of the present disclosure. In certain example embodiments, the UCCR 300 provided in FIG. 3 includes similar components as the UCCR 100 provided in FIG. 1. However, in the UCCR 300, the primary DC power input 102 and the secondary DC power input 104 are also electrically coupled to the controller 112. Additionally, the primary power source 101 and the secondary power source 103 are also electrically coupled to the controller 112. Thus, the controller 112 can monitor that status of the primary DC power input, the secondary DC power input, the primary power source 101, and the secondary power source 103. The controller 112 is also communicative with the UCCR switch 106 and can control the UCCR switch 106 based on the status of the primary DC power input, the secondary DC power input, the primary power source 101, and the secondary power source 103.

Figure 4:
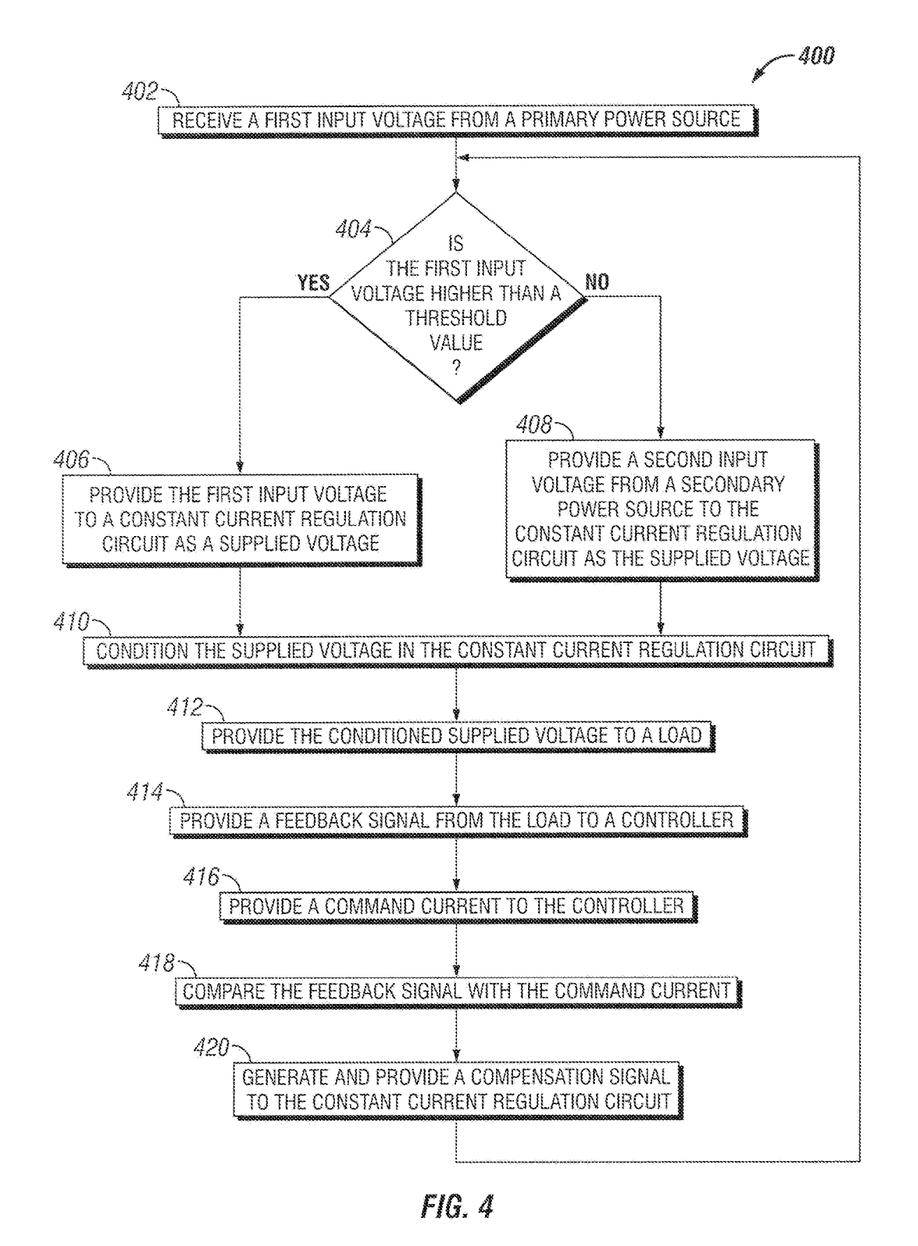
FIG. 4 is a flowchart illustrating a method of providing uninterruptible power to a load, in accordance with certain embodiment of the present disclosure.

FIG. 4 is a flowchart illustrating a method 400 of providing uninterruptible power to a load, in accordance with an example embodiment of the present disclosure. In certain example embodiments, the method 400 includes receiving a first input voltage from a primary power source (step 402). The first input voltage may be from an AC source such as a local utility. Alternatively, the first input voltage may be from a DC source. The method further includes determining if the first input voltage is higher than a predetermined threshold value (step 404). In certain example embodiments, the threshold value is 0 rms volts or another voltage level. If the first input voltage is higher than the threshold value, then the first input voltage is provided to the load. Thus, if the first input voltage is higher than the threshold value, the method 400 includes providing the first input voltage from the primary power source to a constant current regulation circuit as a supplied voltage (step 406). Alternatively, if the first input voltage is not higher than the predetermined threshold value, then the method 400 includes providing a second input voltage from a secondary power source to the constant current regulation circuit as the supplied voltage rather than from the primary source (step 408). In certain example embodiments, the second input voltage is automatically provided to the constant current regulation circuit when the first input voltage is detected to have fallen below the threshold value. In certain example embodiments, switching between providing the first input voltage to the constant current regulation circuit and providing the second input voltage to the constant current regulation circuit is controlled via a diode network. In certain example embodiments, the secondary power source is a DC source such as a battery. Alternatively, the secondary power source may be an AC source.

The method 400 further includes conditioning the supplied voltage (step 410). The supplied voltage is either from the primary source or the secondary source, depending on the decision at step 404. In certain example embodiments, conditioning the power received includes boosting the supplied voltage, converting the supplied voltage into an AC voltage, further stepping up the voltage, and/or other processing steps. After the power is conditioned, the method 400 includes providing the conditioned supplied voltage to a load (step 412).

In certain example embodiments, the method 400 further includes providing a feedback signal from the load to a controller (step 414). The feedback signal is indicative of the actual power level at which the load is operating. The method 400 also includes providing a command current to the controller (step 416). The command current is indicative of a desired power level at which to operate the load. In certain example embodiments, the command current is sent from a user input interface such as a switch, selector, or computer, through which a user or program can select the desired power level at which to operate the load. The controller is configured to compare the feedback signal with the command current (step 418) and generate a compensation signal (step 420). The compensation signal is provided to the a power conditioning circuit and controls how much to boost the voltage received from either power source during power conditioning (step 410). In certain example embodiments, the primary power source may be a DC power source or an AC power source. In certain example embodiments, the secondary power source may be a DC power source or an AC power source.

Although embodiments described herein are made with reference to example embodiments, it should be appreciated by those skilled in the art that various modifications are well within the scope and spirit of this disclosure. Those skilled in the art will appreciate that the example embodiments described herein are not limited to any specifically discussed application and that the embodiments described herein are illustrative and not restrictive. From the description of the example embodiments, equivalents of the elements shown therein will suggest themselves to those skilled in the art, and ways of constructing other embodiments using the present disclosure will suggest themselves to practitioners of the art. Therefore, the scope of the example embodiments is not limited herein.

What is claimed is:

1. An uninterruptible constant current regulator for airfield lighting systems, comprising:
    a primary power input configured to receive a first voltage from a primary power source that includes an alternating current (AC) power source;
    a secondary power input configured to receive a second voltage from a secondary power source that includes a direct current (DC) power source, wherein a charger device is coupled to and charges the secondary power source based on an AC power from the primary power source;
    a constant current regulating circuit configured to regulate and provide power from either the primary power source or the secondary power source to a load that includes an airfield lighting system that includes an airfield lighting series circuit, wherein the constant current regulating circuit comprises a controller, a DC/DC boost converter, a DC/AC inverter, and an output transformer coupled to an output of the DC/AC inverter, wherein the controller is configured to control an output voltage of the DC/DC boost converter provided to the DC/AC inverter, wherein the output transformer is configured to provide the power to the load;
    an AC/root-mean-square (RMS) converter coupled to an output of a current transducer to generate an RMS feedback signal indicative of a current amount through the load; and
    a switching device coupled to the primary power input, the secondary power input, and the constant current regulating circuit, wherein the switching device provides the first voltage to the constant current regulating circuit during a first operating mode, and provides the second voltage to the constant current regulating circuit when the first voltage falls below a threshold value, wherein the controller is configured to receive the RMS feedback signal and an adjustable command current from a user-end input and to generate a control signal based on a difference between the RMS feedback signal and the adjustable command current, wherein the controller comprises a summing node and a loop compensating filter coupled to the summing node, wherein the summing node determines the difference between the RMS feedback signal and the adjustable command current, wherein the compensating filter receives an output of the summing node and performs a gain and bandwidth control, wherein the controller provides the control signal to the DC/DC boost converter to control the power provided to the load, and wherein the output voltage of the DC/DC boost converter depends on the control signal from the controller.

2. The uninterruptible constant current regulator of claim 1, wherein the switching device comprises:
    a first diode, wherein an anode of the first diode is coupled to the primary power input and a cathode of the first diode is coupled to the constant current regulating circuit; and
    a second diode, wherein an anode of the second diode is coupled to the secondary power input and a cathode of the second diode is coupled to the constant current regulating circuit.

3. The uninterruptible constant current regulator of claim 1, wherein the output of the current transducer is indicative of an actual current level of the load and wherein the adjustable command current is indicative of a desired power level of the load.

4. The uninterruptible constant current regulator of claim 3, wherein the controller monitors the primary power input, the secondary power input, the primary power source, and the secondary power source, and controls the switching device based on a status of the primary power input, the secondary power input, the primary power source, and the secondary power source.

5. The uninterruptible constant current regulator of claim 1, wherein the secondary power source includes a battery.

6. An uninterruptible constant current regulator for airfield lighting systems, comprising:
    a primary power input configured to receive a first voltage from a primary power source that includes an alternating current (AC) power source;
    a secondary power input configured to receive a second voltage from a secondary power source that includes a direct current (DC) power source, wherein a charger device is coupled to and charges the secondary power source based on an AC power from the primary power source; and
    a constant current regulating circuit comprising a controller, a DC/DC boost converter, a DC/AC inverter, and an output transformer coupled to an output of the DC/AC inverter, wherein the controller is configured to control an output voltage of the DC/DC boost converter provided to the DC/AC inverter, wherein the output transformer is configured to deliver a regulated power to a load that includes an airfield lighting system that includes an airfield lighting series circuit, wherein the constant current regulating circuit receives either the first voltage from the primary power source or the second voltage from the secondary source, wherein the constant current regulating circuit automatically switches from receiving the first voltage to receiving the second voltage when the first voltage falls below a threshold value, wherein the controller is configured to receive a feedback signal from the load and an adjustable command current from a user-end input and to generate a control signal based on a difference between the feedback signal and the adjustable command current, wherein the controller comprises a summing node and a loop compensating filter coupled to the summing node, wherein the summing node determines the difference between the feedback signal and the adjustable command current, wherein the compensating filter receives an output of the summing node and performs a gain and bandwidth control, and wherein the controller provides the control signal to the DC/DC boost converter to control the regulated power delivered to the load, and wherein the output voltage of the DC/DC boost converter depends on the control signal from the controller.

7. The uninterruptible constant current regulator of claim 6, further comprising:
   a first diode, wherein an anode of the first diode is coupled to the primary power input and a cathode of the first diode is coupled to the constant current regulating circuit; and
   a second diode, wherein an anode of the second diode is coupled to the secondary power input and a cathode of the second diode is coupled to the constant current regulating circuit.

8. The uninterruptible constant current regulator of claim 6, further comprising an AC/DC converter coupled to the primary power input and that provides the first voltage to the primary power input.

9. The uninterruptible constant current regulator of claim 6, wherein the secondary power source is a battery.

10. The uninterruptible constant current regulator of claim 6, wherein the feedback signal is a root-mean-square (RMS) signal indicative of an actual current amount at the load.

11. A method of providing uninterruptible power to airfield lighting systems, comprising:
   receiving a first input voltage from a primary power source that includes an alternating current (AC) power source;
   determining if the first input voltage is higher than a threshold value;
   when the first input voltage is higher than the threshold value, providing the first input voltage to a constant current regulation circuit as a supplied voltage;
   when the first input voltage is not higher than the threshold value, providing a second input voltage from a secondary power source to the constant current regulation circuit as the supplied voltage, wherein the secondary power source includes a direct current (DC) power source, wherein a charger device is coupled to and charges the secondary power source based on an AC power from the primary power source, and wherein the second input voltage is automatically provided to the constant current regulation circuit when the first input voltage is detected to have fallen below the threshold value;
   providing a feedback signal from a load to the controller, the feedback signal being indicative of an actual current level at which the load is operating;
   receiving, by the controller, an adjustable command current from a user-end input, wherein the adjustable command current is indicative of a desired power level at which to operate the load;
   comparing, by the controller, the adjustable command current and the feedback signal to generate a difference signal;
   generating a compensation command signal based on the difference signal;
   conditioning, by the constant current regulation circuit, the supplied voltage based on the compensation command signal, wherein the constant current regulating circuit comprises an output transformer, a controller, a DC/DC boost converter, and a DC/AC inverter, wherein the output transformer is coupled to an output of the DC/AC inverter, wherein the controller is configured to provide the compensation command signal to the DC/DC boost converter to control an output voltage of the DC/DC boost converter provided to the DC/AC inverter; and
   providing, by the output transformer, a conditioned supplied voltage to the load, wherein the load includes an airfield lighting system that includes an airfield lighting series circuit.

12. The method of claim 11, wherein conditioning the supplied voltage further comprises:
   boosting the supplied voltage according to a desired level; and
   converting the supplied voltage into a voltage type usable by the load.

13. The method of claim 11, further comprising switching between providing the first input voltage to the constant current regulation circuit and providing the second input voltage to the constant current regulation circuit via a diode network.

14. The method of claim 11, wherein the feedback signal is a root-mean-square (RMS) signal indicative of an actual current amount at the load.

15. The method of claim 11, wherein the secondary power source includes a battery.

* * * * *